Patented June 8, 1926.

1,588,376

UNITED STATES PATENT OFFICE.

GEORG KALISCHER, OF MAINKUR, NEAR FRANKFORT-ON-THE-MAIN, AND RUDOLF MÜLLER AND FRITZ FRISTER, OF FECHENHEIM, NEAR FRANKFORT-ON-THE-MAIN, GERMANY.

PRODUCTION OF BENZANTHRONE DERIVATIVES.

No Drawing. Original application filed March 19, 1925, Serial No. 16,795, and in Germany December 24, 1924. Divided and this application filed August 17, 1925. Serial No. 50,844.

We have found that benzanthrone derivatives may be obtained according to a new process entirely different from any one used hitherto and which consists in reducing α- naphthalene-azo-benzene-m-carboxylic acid or the substitution products thereof to the hydrazocompounds, in transforming the α-naphthalene-hydrazo-benzene-m-carboxylic acids thus obtained in acid solution into the 4.4'-diaminonaphthylphenyl-2'-carboxylic acids in replacing by means of the so-called Sandmeyer method the two amino- groups of the 4.4'-diaminonaphthylphenyl-2'-carboxylic acids thus obtained by hydrogen, halogen, hydroxyl, methoxyl etc. and in condensing the products thus obtained into derivatives of benzanthrone, hologenbenzanthrone, hydroxybenzanthrone, etc.

The different phases of the reaction may be represented by the following formulae, dichlorobenzanthrone used as prototype for the whole class of benzanthrone derivatives obtainable by the new process

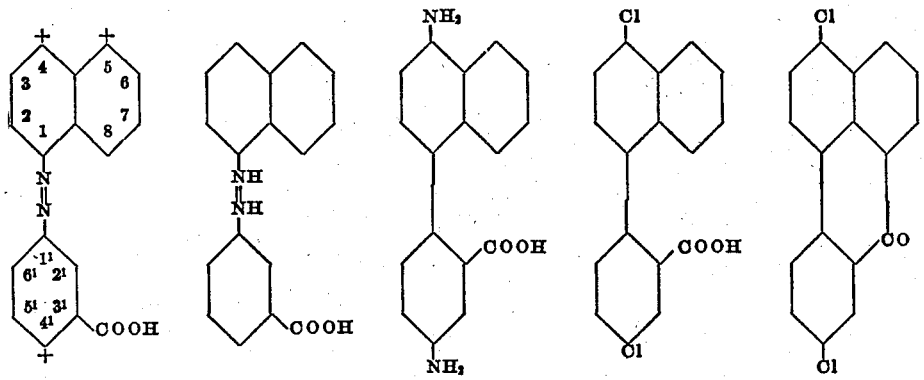

The α-naphthalene-azo-m-carboxylic acid or its substitution products serving as starting materials for the new process may be obtained by boiling with alcohol the diazo-compounds of the azo dyes, which are formed by combining diazobenzene-m-carboxylic acid with α-naphthylamine or its derivatives. Generally speaking only those derivatives of α-naphthalene-azo-benzene-m-carboxylic acid can be used for the new process, in which the ana-5-position corresponding to the azo group of the naphthalene nucleus and the two p-positions to the azo group (the C-atoms marked in the first formula by a +) are not substituted.
The reduction of the azocompounds may be effected with all the reducing agents used hitherto for this reaction, i. e. stannous chloride, sulfurous acid, zinc dust etc. The reduction and the transformation of the hydrazocompounds thus obtained may be with great advantage carried out in one operation by working in a mineral acid solution.

The transformation of the diaminogroups of the 4.4'-diamino-naphthylphenyl-2'-carboxylic acids into halogen, hydroxyl, hydrogen, etc. is carried out by treating the tetrazo bodies of the diaminocompounds by means of the various forms of the so-called Sandmeyer reaction. In this manner e. g. by treating with hydrohalogenic acids in the presence of copper or cuprous salts, halogen derivatives, by treating with diluted sulfuric acid hydroxyl derivatives are obtained, whilst by treating e. g. with alcohol the exchange of the diazogroups into hydrogen is effected.

The naphthylphenyl-2-carboxylic acids or their substitution products can best be condensed into the corresponding benzanthrone derivatives by means of acid condensing agents, such as sulfuric acid, chlorosulfonic acid, chloride of zinc, etc. The formation of the closed chain may also be effected by converting the acids at first into the chlorides and by treating the latter with aluminium chloride.

The benzanthrone derivatives thus obtained are valuable intermediate products for the production of vat dyestuffs of the violanthrone and isoviolanthrone series.

In order to illustrate our present invention we give the following example:

*Example.*

A suspension of 48 kg. of the sodium salt of the α-naphthalene-azo-benzene-m-carboxylic acid, obtainable by boiling the diazocompound of the dyestuff from m-diazobenzoic acid and α-naphthylamine with alcohol, in 200 kg. alcohol is allowed to run within ½ hour at 50° into a solution of 112 kg. stannous chloride in 360 kg. concentrated hydrochloric acid, the temperature being kept below 60°. In order to ensure complete transformation, the solution is stirred for some time at 50° and the reaction product is then separated by filtration. For purifying the dihydrochloride of the 4.4′diaminonaphthylphenyl-2′-carboxylic acid thus obtained, the raw product is dissolved in hot water and separated again as a light grey sediment by the addition of concentrated hydrochloric acid. By addition of the calculated amount of alkali, the free diamino-naphthylphenyl-carboxylic acid, which is sparingly soluble in water, is precipitated, whereas with an excess of alkali the easily soluble sodium salt is formed. By the action of nitrous acid an easily soluble golden yellow tetrazocompound is obtained, which yields with R-salt a violet dyestuff.

17 kg. of the 4.4′-diamino-naphthylphenyl-2′-carboxylic acid are tetrazotized in a hydrochloric acid solution in the customary manner; the tetrazo solution is run at 70° into a solution of cuprous chloride prepared from 27 kg. copper sulfate. The reaction is completed by heating for some time to 80—90°, and the 4.4′-dichloronapthylphenyl-2′-carboxylic acid, which separates as a red powder is filtered off. For the purpose of purifying the compound, it is dissolved in dilute caustic soda solution and again precipitated with acid. The transformation into the dichlorobenzanthrone takes place for instance by dissolving in 10 times its weight of chlorosulfonic acid at a temperature not exceeding 10° and by allowing the reaction mixture to flow on an excess of ice. The dichlorobenzanthrone is obtained in the form of brown-yellow crystals, which melt at about 215° when recrystallized from glacial acetic acid. The solution in concentrated sulfuric acid is reddish-brown colored with a red fluorescence. In a similar manner the dichloro products of substituted benzanthrones may be produced by starting from the corresponding diamino-naphthylphenyl-carboxylic acid.

The exchange of the diazo group for other groups such as hydrogen, hydroxyl, etc. may likewise easily be effected according to the usual methods. For instance, the 4.4′-diamino - 7 - methoxynaphylphenyl-2′-carboxylic acid is converted into the 7-methoxynaphthylphenyl-2′-carboxylic acid by boiling the tetrazo compound with alcohol. This compound, which is obtained in form of a brown powder, is then transformed into the corresponding 4-methoxybenzanthrone by treatment with acid condensing agents as indicated above.

The Bz-2-methoxybenzanthrone is likewise obtained by subjecting the 4.4′-diamino-3-methoxynaphthylphenyl-2′-carboxylic acid to the same process.

Having now particularly described and ascertained the nature of our said invention and in what manner the same is to be performed, we declare, that what we claim is:

1. Process for the production of benzanthrone derivatives which consists in treating α-naphthalene-azo-benzene-m-carboxylic acid (in which the C-atoms 4, 5, and 4′ corresponding to the following formula:

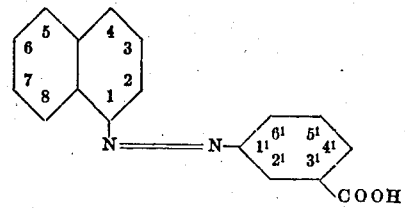

are not substituted) with reducing agents in an acid solution, tetrazotizing the diaminonaphthylphenyl-o-carboxylic acid thus obtained, subjecting the tetraozbodies to the so-called Sandmeyer method and in condensing the naphthylphenyl-o-carboxylic acid compounds thus obtained and represented by the following general formula:

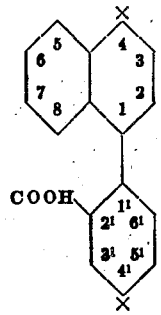

X means halogen, H, OH, OCH$_3$, OC$_2$H$_5$. The C-atoms 2, 3, 5, 6, 7, 3', 5', 6' may be substituted by univalent groups (as CH$_3$, halogens, O-alkyl), with acid condensing agents substantially as described.

2. Process for the production of dichlorobenzanthrone which consists in treating α-naphthalene-azo-benzene-m-carboxylic acid with reducing agents in an acid solution, tetrazotizing the diaminonaphylphenyl-o carboxylic acid thus obtained, substituting the diazogroups by chlorine by means of the so-called Sandmeyer method and in condensing the dichloronaphthylphenyl-o-carboxylic acid of the following formula:

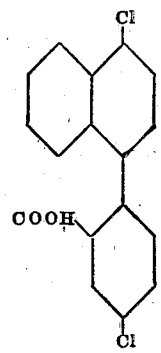

with acid condensing agents substantially as described.

In witness whereof we have hereunto signed our names this fourth day of August 1925.

GEORG KALISCHER.
RUD. MÜLLER.
FRITZ FRISTER.